(12) United States Patent
Mosser et al.

(10) Patent No.: US 10,648,534 B2
(45) Date of Patent: May 12, 2020

(54) LINK BELT AND METHOD FOR PRODUCING SAME

(71) Applicant: Fenner U.S., Inc., Manheim, PA (US)

(72) Inventors: Eric S. Mosser, Palmyra, PA (US); Tyson Gabler, New Cumberland, PA (US)

(73) Assignee: FENNER U.S., INC., Manheim, PA (US)

( * ) Notice: Subject to any disclaimer, the term of this patent is extended or adjusted under 35 U.S.C. 154(b) by 163 days.

(21) Appl. No.: 15/826,094

(22) Filed: Nov. 29, 2017

(65) Prior Publication Data

US 2018/0156310 A1    Jun. 7, 2018

Related U.S. Application Data

(60) Provisional application No. 62/429,573, filed on Dec. 2, 2016.

(51) Int. Cl.
*B29C 70/30* (2006.01)
*B29D 29/06* (2006.01)
(Continued)

(52) U.S. Cl.
CPC ............... *F16G 1/24* (2013.01); *B29C 70/06* (2013.01); *B29C 70/086* (2013.01); *B29C 70/30* (2013.01); *B29D 29/06* (2013.01); *B29D 29/10* (2013.01); *B65G 15/34* (2013.01); *B65G 17/08* (2013.01); *B65G 17/40* (2013.01); *F16G 5/16* (2013.01); *B29C 70/545* (2013.01);
(Continued)

(58) Field of Classification Search
CPC ....... B29C 55/00; B29C 70/06; B29C 70/086; B29C 70/22; B29C 70/30; B29C 70/42; B29C 70/545; B29C 2793/0009; B29C 2793/0018; B29C 2793/0045; B29C 2793/0072; B29C 2793/009; B29D 29/06; B29D 29/10; B29L 2029/00; B29L 2031/7092; B29L 2031/7094; B65G 15/34; B65G 17/06; B65G 17/08; B65G 17/32; B65G 17/38; B65G 17/40; B65G 2812/02198; F16G 1/16; F16G 1/22; F16G 1/24; F16G 5/16; F16G 5/166; F16G 5/18

See application file for complete search history.

(56) References Cited

U.S. PATENT DOCUMENTS

| | | |
|---|---|---|
| 72,181 A | 12/1867 | Fountain |
| 1,177,664 A | 4/1916 | Vuilleumier |

(Continued)

FOREIGN PATENT DOCUMENTS

JP    59-97345    6/1984

*Primary Examiner* — Michael A Tolin
(74) *Attorney, Agent, or Firm* — Shumaker, Loop & Kendrick, LLP; James D. Miller (57) ABSTRACT

A link belt is provided wherein the link belt is formed of a plurality of links forming a series of links in successive overlapping relation. The link belt includes a first end having a first connector and a second end having a second connector so that the first connector is connected with the second connector to form a continuous loop of link belt. The link belt is formed by applying a lateral force against the assembled link belt while the link belt is under an axial tension to stretch the belt. After the step of stretching the belt, the first connector is connected with the second connector to form a continuous belt.

19 Claims, 4 Drawing Sheets

(51) Int. Cl.
    *B29D 29/10*         (2006.01)
    *B65G 15/34*         (2006.01)
    *B65G 17/08*         (2006.01)
    *F16G 1/24*          (2006.01)
    *F16G 5/16*          (2006.01)
    *B29C 70/06*         (2006.01)
    *B65G 17/40*         (2006.01)
    *B29C 70/08*         (2006.01)
    *B29L 31/00*          (2006.01)
    *B29C 70/54*          (2006.01)

(52) U.S. Cl.
    CPC ............. *B29C 2793/0009* (2013.01); *B29C 2793/0072* (2013.01); *B29L 2031/7092* (2013.01); *B29L 2031/7094* (2013.01); *B65G 2201/02* (2013.01); *B65G 2812/02198* (2013.01)

(56) References Cited

U.S. PATENT DOCUMENTS

| | | | |
|---|---|---|---|
| 1,182,933 A | 5/1916 | Schulte | |
| 1,438,566 A | 12/1922 | Wiggins | |
| 1,519,165 A | 12/1924 | Pilliner | |
| 2,682,777 A * | 7/1954 | Schornstein | F16G 5/16 474/241 |
| 2,969,686 A | 1/1961 | Runton | |
| 3,154,960 A | 11/1964 | Creswell | |
| 3,154,961 A | 11/1964 | Creswell | |
| 3,269,523 A | 8/1966 | Creswell | |
| 3,288,273 A | 11/1966 | Michaelson et al. | |
| 3,345,113 A | 10/1967 | Siber | |
| 3,375,726 A * | 4/1968 | Jones | F16G 5/16 474/241 |
| 3,387,500 A | 6/1968 | Hutzenlaub et al. | |
| 3,418,862 A | 12/1968 | Hurbis | |
| 3,857,478 A | 12/1974 | Meeusen | |
| 3,991,632 A | 11/1976 | Stephens | |
| 4,015,038 A | 3/1977 | Romanski et al. | |
| 4,028,956 A | 6/1977 | Thompson | |
| 4,055,265 A | 10/1977 | Eiserman | |
| 4,377,365 A | 3/1983 | Layh | |
| 4,458,809 A | 7/1984 | White et al. | |
| 4,550,823 A | 11/1985 | Gladish | |
| 4,588,073 A | 5/1986 | Abell | |
| 4,675,229 A | 6/1987 | Westhead | |
| 4,688,615 A | 8/1987 | Lee | |
| 4,903,824 A | 2/1990 | Takahashi | |
| 4,922,304 A | 5/1990 | Gilbert et al. | |
| 4,925,013 A | 5/1990 | Lapeyre | |
| 4,957,199 A | 9/1990 | Wokke et al. | |
| 5,011,003 A | 4/1991 | Gladding | |
| 5,176,246 A | 1/1993 | Wiggers et al. | |
| 5,332,786 A | 7/1994 | Nagata et al. | |
| 5,361,893 A | 11/1994 | Lapeyre et al. | |
| 5,507,383 A | 4/1996 | Lapeyre et al. | |
| 5,564,558 A | 10/1996 | Hampton et al. | |
| 5,582,287 A | 12/1996 | Heit et al. | |
| 5,658,634 A | 8/1997 | Ragland et al. | |
| 5,667,058 A | 9/1997 | Bonnet | |
| 5,853,849 A | 12/1998 | Nishio et al. | |
| 5,984,082 A | 11/1999 | Geib | |
| 6,062,379 A | 5/2000 | Geib et al. | |
| 6,173,831 B1 | 1/2001 | Grabscheid et al. | |
| 6,565,689 B2 | 5/2003 | Geib et al. | |
| 6,770,004 B1 | 8/2004 | Lofgren et al. | |
| 7,004,311 B2 | 2/2006 | Fatato et al. | |
| 7,214,354 B2 | 5/2007 | Ongaro | |

\* cited by examiner

LINK BELT AND METHOD FOR PRODUCING SAME

PRIORITY CLAIM

This application claims priority to U.S. Provisional Application No. 62/429,573 filed Dec. 2, 2016. The entire disclosure of the foregoing application is hereby incorporated herein by reference.

FIELD OF THE INVENTION

The present invention relates to interlocking-link belts and has particular use in applications in which the belt is operated under tension. In particular, the present invention relates to a pre-stretched link belt that reduces slippage between the belt and pulleys around which the link belt is entrained. The present invention also relates to a method for forming such a belt.

BACKGROUND OF THE INVENTION AND DISCUSSION OF PRIOR ART

Link belts are generally known and used in a variety of applications. In many applications link belts are operated under tension. For example, a link belt may be used to transmit power from a drive pulley to a driven pulley. Over time the tension in the link belt may tend to stretch the belt causing slippage between the belt and elements around which the belt is entrained. Such slippage typically requires maintenance, which may include shutting down operation of the belt, releasing tension on the belt, removing a link from the belt, reconnecting the belt and re-tensioning the belt.

SUMMARY OF THE INVENTION

In light of the foregoing, there is a need for a link belt that overcomes the problems of the known link belts. Accordingly, a link belt assembly is provided wherein the link belt includes a plurality of overlapping belt links. Each belt link may include an integral fastener and an aperture so that adjacent links can be connected by inserting the fastener of a belt link through the aperture of an adjacent link. The link belt is formed by applying a lateral force to the belt while the belt is under axial tension to thereby stretch the length of the belt. The length of belt includes a first connector at a first end and a second connector at the second end. After the belt is stretched, the first connector is connectable with the second connector to form a continuous loop.

A method for producing a link belt is also provided. The method includes the step of providing a plurality of belt links. The belt links are assembled to form a belt by connecting adjacent links. After the links are assembled to form a belt, an axial force is applied to the belt. A lateral force is then applied to the belt. The lateral force is applied transverse the axial force to stretch the belt during the step of applying an axial force to the belt. The steps of applying an axial force and applying a lateral force to stretch the belt occur prior to connecting the ends of the belt to form a continuous loop.

According to another aspect, the present invention may also comprise a method of producing a link belt comprising the step of applying a reciprocal force against a surface of the belt. The step of applying a reciprocal lateral force may comprise the step of displacing an element toward and away from the belt.

According to yet another aspect, the present invention may also comprise a method for producing a link belt comprising the step of applying a lateral force against the link belt by rotating a carousel having a plurality of engagement elements configured to engage the belt. The step of rotating a carousel may comprise the step of rotating the carousel at an angular velocity such that the engagement elements move relative to the link belt. The belt may be pulled around the carousel under tension so that the belt travels at an angular velocity that is lower than the angular velocity of the carousel.

According to a further aspect, the present invention may also comprise the method of forming a link belt by conveying the link belt through an oven to heat the link belt to a temperature exceeding ambient temperature while the link belt is under axial tension.

DETAILED DESCRIPTION

Figure 1:
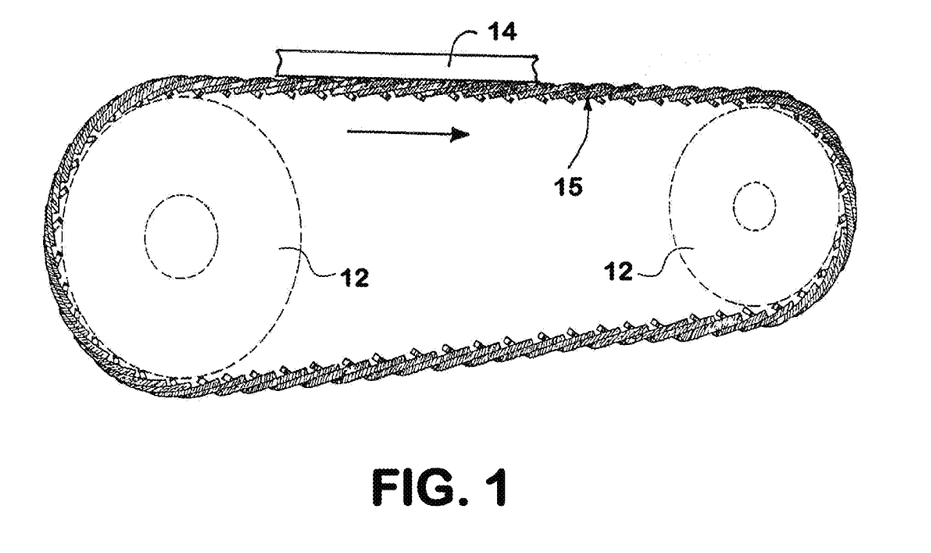
FIG. 1 is a side view of an interlocking-link belt assembly.

Referring now to the drawings in general and FIG. 1 specifically, the preferred embodiment of a conveyor assembly comprising a link belt 15 is illustrated. The assembly includes a pair of drive elements 12, such as pulleys, about which the link belt 15 is entrained. The assembly is shown transporting a workpiece 14, however, the belt 15 need not be a conveyor belt. The link belt 15 may be used instead for power transmission, such as to transfer power from a drive pulley to a driven pulley.

Figure 2:
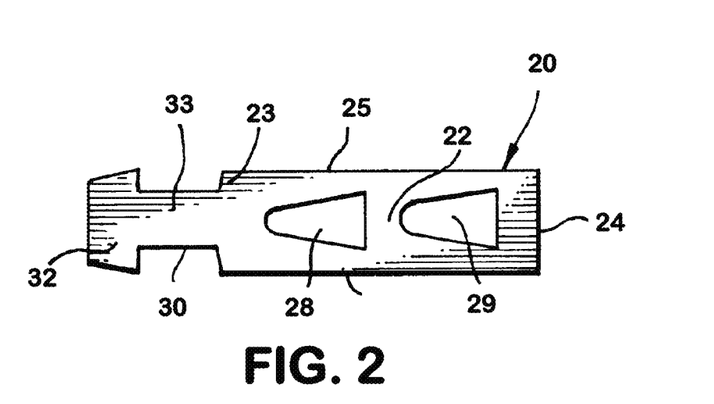
FIG. 2 is a top view of an individual link of the belt shown in FIG. 1 prior to assembly.
Figure 3:
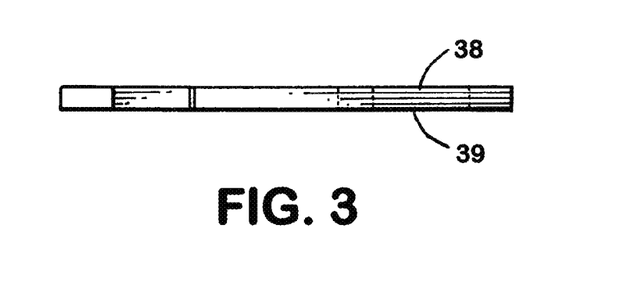
FIG. 3 is a side view of the individual belt link shown in FIG. 2.

Referring to FIGS. 1-3, the belt 15 preferably comprises a series of interlocking belt links 20. One of the individual links 20 that comprise belt 15 is illustrated in FIGS. 2 and 3. Each belt link 20 has a body portion 22 and a fastener 30 connected to the body portion. In the present instance, the thickness of the belt link 20 between the top surface 38 and the bottom surface 39 is substantially uniform throughout the entire link.

The body portion 22 of the belt link 20 is generally rectangular, having two edges 25 extending longitudinally between a leading end 23 and a trailing end 24, both of which extend transversely between the two edges. Adjacent leading end 23 a leading aperture 28 extends through the thickness of body portion 22. Longitudinally spaced from the leading aperture 28, adjacent the trailing end 24, a trailing aperture 29 extends through the thickness of body portion 22.

The leading end 23 corresponds to the direction in which the belt 15 travels as shown by the arrow in FIG. 1. However, the direction in which the belt 15 travels can be reversed so that the leading end 23 does not lead the trailing end 24 with respect to the actual travel of the belt.

The fastener 30 is integrally connected with the body portion 22 and comprises a fastening tab 32 and a constricted neck 33. The neck extends longitudinally, with one end connected to the fastening tab 32, and the other end connected to the leading end 23 of body 22. The length of the neck 33 between the leading end 23 and the fastening tab 32 is sufficiently long to allow the fastening tab 32 to extend through the apertures in two belt links 20 as will be further discussed below.

The fastening tab 32 is generally trapezoidal shaped, having two parallel ends that are transverse the neck 33. The fastening tab 32 is substantially wider than the neck 33, being widest at the point where it intersects the neck, and tapering as it extends away from the neck.

The belt links 20 are connected by passing the link fasteners through the apertures in adjacent belt links. To ensure that the belt links can properly connect, the apertures are configured and dimensioned with reference to the fastening tab and the neck.

In the present instance, the apertures through body 22 are non-circular. Both apertures 28 and 29 are longitudinally elongated so that their length is greater than their width. To ensure that fastening tab 32 can pass through the apertures, the length of the apertures is greater than the greatest width of the fastening tab 32.

The width of apertures 28 and 29 is not necessarily constant. Instead, the apertures may widen as they extend toward trailing end 24. To provide proper connection between the belt links 20, the apertures are narrower than the fastening tab width so that the fastening tab 32 cannot pass back through the apertures once the belt links are connected. However, the apertures are wider than the neck 33 to allow the neck to extend through the apertures while the belt links are connected, as will be discussed below.

The belt links 20 are made of a material of sufficient tensile strength to convey the weight of the workpiece 14 or transmit the necessary power, if used in a power transmission application. In an exemplary embodiment, the belt links 20 are made of a thermoset urethane that is reinforced with a polyester fabric.

Figure 4:
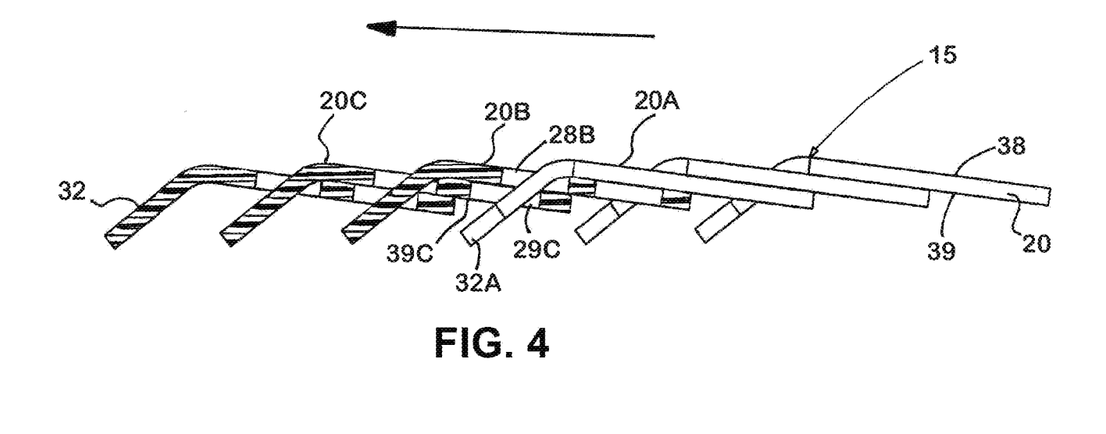
FIG. 4 is a fragmentary side view partially in section, of the belt shown in FIG. 1.
Figure 5:
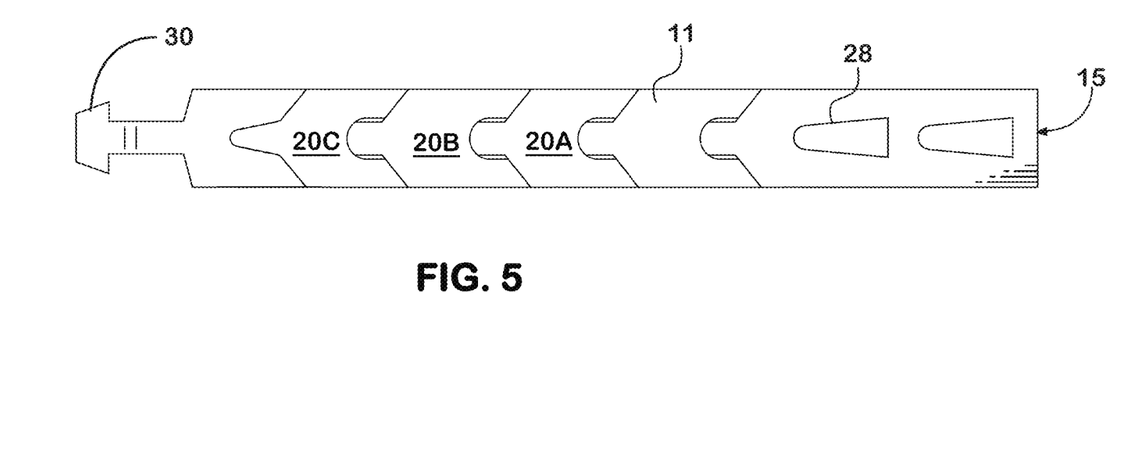
FIG. 5 is a plan view of the belt shown in FIG. 4.

As shown in FIGS. 4 and 5, a series of belt links 20 are arranged in a superimposed successive overlapping relation to form the belt 15. The bottom surface 39 of each belt link overlaps the top surface 38 of an adjoining belt link, so that the thickness of the belt 15 is at least twice the thickness of an individual belt link 20.

FIGS. 4-5 illustrate a portion of the belt link 15 in which the links 20 are interconnected. Included in these views is the connection between a belt link 20A, and the two preceding belt links, 20B, and 20C. In this connection, the fastening tab 32A of belt link 20A passes sideways through apertures in the two preceding belt links. It first passes through the leading aperture 28B of the adjacent preceding belt link 20B and then passes through the trailing aperture 29C of the next preceding belt link 20C.

After passing through the aperture in belt link 20C, the belt link fastening tab 32A is twisted to bear against the bottom surface 39C of belt link 20C. When connected in this way, the top surface of belt link 20A is the top side 11 of belt 15, and the bottom surface 39C of belt link 20C is the bottom side of belt 15.

The belt links 20 are produced as follows. The belt links 20 that make up the belt 15 may include at least one layer of reinforcing material, such as woven polyester sheet. The reinforcing material is impregnated with a binding material to form a composite material. The binding material is liquified and deposited onto the reinforcing material while liquid. Preferably, the composite material includes a plurality of layers of reinforcing material and the binding material is a thermoset urethane. The material is then cured so that the reinforcing material is embedded within the binding material. In the present instance, the belt material is polyester reinforced thermoset urethane. It should be understood that the foregoing description is an exemplary embodiment. The links may be formed of a number of different materials depending upon the application and may include a reinforcement element or may be formed without a reinforcement element.

The belt links 20 are interconnected to form a length of belt. The links may be manually interconnected, however, in the present instance, a link assembler 70 forms a length of belt by automatically interconnecting a plurality of belt links. The belt links 15 are connected to one another as detailed above and shown in FIGS. 4 and 5. Specifically, the belt links 20 are interconnected to form a length of belt. The length of belt has a first connector, such as fastener 30, at a first end and a second connector, such as aperture 28, at a second end as shown in FIG. 5. Preferably, the assembled belt is then trimmed by cutting the edges of the belt to form beveled edges that engage the sheaves of the pulleys about which the conveyor assembly 10 travels. The ends of the length of belt can be connected to form a continuous loop by connecting the first connector with the second connector.

Figure 6:
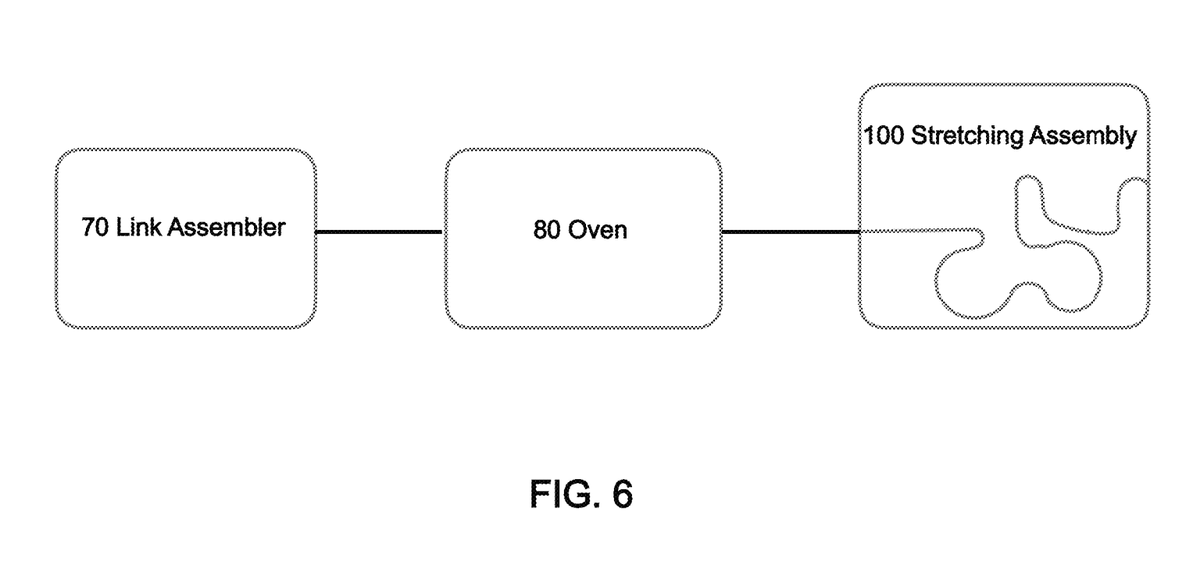
FIG. 6 is a block diagram illustrating the steps in the method for producing the conveyor assembly illustrated in FIG. 1.

From the link assembler 70, the length of belt material is stretched by one or more steps. For instance, the link belt 15 may be heated and pulled under tension. As shown in FIG. 6, the belt may be pulled through an oven 80 under tension. The tension applied to the belt is axial tension that pulls the belt parallel to the length of the belt. For example, tension may be applied to the belt along an axis parallel to the arrow shown in FIG. 4. In this way, the tension in the belt is along the length of the belt links.

In the oven 80, the belt is exposed to temperatures significantly above ambient temperature. The belt 15 is pulled through the oven 80 under tension to stretch the belt. In particular, the belt may stretch from the belt fasteners 30 seating into the apertures 28, 29 of adjacent links rather than the individual links stretching. In other words, the stretching of the belt in the oven 80 is due to movement of the links relative to one another rather than due to the individual links elongating.

From the oven 80, the belt may then be subjected to a stretching assembly 100. In the stretching assembly 100, an axial tension is applied to the belt to pull the belt 15 through the stretching assembly. The axial tension is along the length of the belt, similar to the tension applied to the belt as the belt is pulled through the oven 80. In addition to the axial force applied to the belt 15, a transverse force is applied to the belt as the belt passes through the stretching assembly 100. In particular, a plurality of lateral forces are applied to the belt as the belt is pulled through the stretching assembly. In an exemplary assembly, the stretching assembly applies a plurality of reciprocal forces against the belt. The reciprocal forces are transverse the tension that pulls the belt through the stretching assembly. The stretching of the belt in the stretching assembly is substantially due to movement of the links relative to one another rather than elongation of the individual links.

Figure 7:
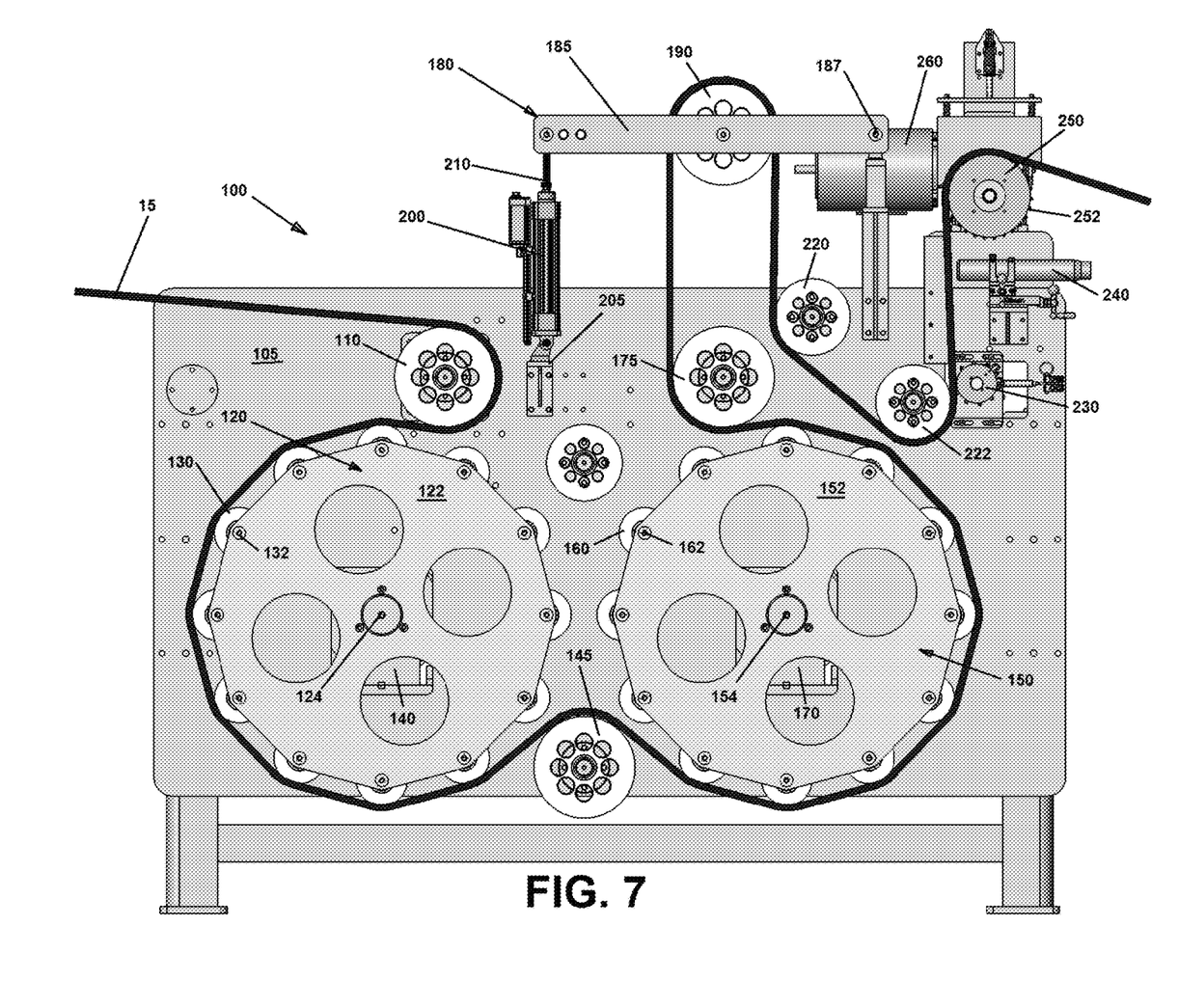
FIG. 7 is a side view of a belt stretching assembly for forming the belt illustrated in FIG. 1.

Referring to FIG. 7, the stretching assembly 100 comprises one or more elements for applying repetitive transverse forces against the belt as the belt is pulled through the stretching assembly. In the present instance, a lateral force applied to the belt is meant to include any force applied to the belt 15 that is transverse the axis or length of the belt. For instance, a lateral force includes a force that is normal to the top surface 38 or bottom surface 39 of the links (See FIGS. 4 & 5 for the top and bottom surfaces 38, 39).

The belt 15 enters the stretching assembly 100 and wraps around an entrance pulley 110. The entrance pulley 110 is rotatably mounted on a base plate 105 and may be any of a variety of pulley configurations, such as a v-groove pulley or sheave. The entrance pulley 110 may be a drive pulley, however, in the present instance the entrance pulley is an idler pulley. The belt wraps around the entrance pulley to change directions. In the present instance, the belt reverses directions as shown in FIG. 7.

From the entrance pulley 110, the belt 15 wraps around a first carousel 120. The first carousel is connected with the base plate 105 so that the carousel rotates relative to the base plate. The first carousel comprises a frame 122 that rotates around a central axis 124. A plurality of carousel pulleys 130 are connected to the frame around the periphery of the frame. For instance, the frame 122 may be any of a variety of geometric shapes, including a polygon, a circle or otherwise. The carousel pulleys 130 are spaced apart from one another around the frame 122. Each carousel pulley 130 is rotatable about a pulley axis 132. Each carousel pulley is connected to the frame 122 so that each carousel pulley 130 is rotatable relative to the frame about the pulley axis. As shown in FIG. 7, each pulley axis 132 is substantially parallel to the central axis 124 of the carousel 120 Additionally, each pulley axis 132 is transverse the axial length of the belt 15.

A carousel motor 140 drives the carousel frame 122 so that the carousel frame rotates about the carousel axis 122. In this way, the carousel pulleys 130 also rotate about the carousel axis 122.

The belt 15 wraps around a portion of the first carousel 120 and discharges from the first carousel by wrapping around an intermediate pulley 145. The intermediate pulley 145 is an idler pulley adjacent a second carousel 150. The belt 15 continues from the intermediate pulley and wraps around the second carousel 150. The second carousel 150 is configured substantially similar to the first carousel. In particular, the second carousel 150 includes a frame 152 that rotates around a central axis 154 and has a plurality of carousel pulleys 160 spaced apart around the frame 152. The carousel pulleys 160 are rotatably connected to the frame 152 so that the carousel pulleys rotate relative to the frame 152. Each carousel pulley 160 is rotatable about a pulley axis 162 that is transverse the axial length of the belt. The second carousel may also include a second motor 170 for rotating the carousel frame 152 around the central axis. Alternatively, the second carousel may be interconnected with the motor that drives the first carousel. For instance, the second carousel may be interconnected with the drive motor 140.

A discharge pulley 175 is attached to the base plate 105 adjacent the second carousel 150. The discharge pulley 175 is a pulley or roller rotatable relative to the base plate. The belt 15 wraps around a portion of the discharge pulley to pull the belt away from the second carousel.

From the discharge pulley 175 the belt 15 wraps around a tensioner assembly 180 configured to take up slack and maintain axial tension in the belt 15 as the stretching assembly 100 stretches the belt. The tensioner 180 comprises a tensioner pulley 190 rotatably connected to a pivotable arm 185. The pivotable arm 185 pivots about a pivot axis 187. The pivot axis 187 is connected with the base plate 105 so that the pivot axis is fixed relative to the base plate while the end remote from the pivot axis is displaceable relative to the base plate 105. In this way, the end of the pivot arm 185 remote from the pivot axis 187 is displaceable relative to the carousels 120, 150.

A biasing element 200 applies a biasing force on the pivotable arm 185. The biasing element 200 is connected with the pivotable arm at a point along the arm spaced apart from the pivot axis. In the present instance, the pivot axis 187 is at a first end of the pivot arm 185 and the biasing element 200 connects with the second end of the arm, remote from the pivot axis.

The biasing element 200 may be any of a variety of elements operable to apply a biasing force onto the pivotable arm 185 to bias the arm away from the discharge pulley 175. For instance, the biasing element 200 may be a spring such as a coil spring. Alternatively, the biasing element may be a hydraulic or pneumatic cylinder. In the present instance, the biasing element 200 is a pneumatic cylinder having a connecting rod 210. A mounting bracket 205 connects the pneumatic cylinder to the base plate so that the pneumatic cylinder is fixed relative to the base plate 105. The connecting rod 210 has a first end disposed within the pneumatic cylinder and a second end connected with the pivot arm 187. The pneumatic cylinder biases the connecting rod outwardly to urge the pivot arm away from the discharge pulley 175. In this way, as the belt stretches, the biasing force of the biasing element 200 urges the pivot arm upwardly to pivot the pivot arm 185 upwardly, thereby displacing the tensioner pulley 190 upwardly to apply axial force along the length of the belt to thereby take up the slack in the belt.

From the tensioner assembly 180, the belt passes over one or more idler pulleys 220, 222 that direct the belt toward a drive element 250 that drives the belt through the stretching assembly. The stretching assembly may also include a detector 230 for detecting a characteristic of the belt. For instance, the detector 230 may be a length detector that detects the length of the belt. The detector 230 may include an element for positively engaging the belt. For instance, the detector may include a rotatable wheel having a plurality of protrusions or pins. The protrusions engage the apertures 28 in the belt links 20 to register the belt relative to the detector. A printer 240 may also be included for printing product data onto the belt as the belt passes by the printer. The printer may be an inkjet printer for printing information, such as lot number, date of manufacture and/or product number.

The stretching assembly may include one or more elements for driving the belt 15 through the stretching assembly under tension. In the present instance, the stretching assembly includes a drive assembly 250 operable to drive the belt 15 forwardly. The drive assembly 250 is positioned adjacent the discharge of the stretching assembly 100 so that the drive assembly 250 pulls the belt 15 through the stretching assembly. The drive assembly 250 comprises a rotatable wheel having a plurality of pins 252 that protrude outwardly toward the belt 15. The pins 252 are spaced apart around the circumference of the wheel. The pins 252 engage the holes 28 in the belt links 20 so that as the drive wheel 250 rotates forwardly the pins drive the belt forwardly. The drive wheel 250 is connected with a drive motor 260 that rotates the drive wheel. The drive motor 260 drives the drive wheel 250 which in turn drives the belt forwardly. In this way, the drive wheel 250 drives the belt 15 forward, thereby applying axial tension on the belt to pull the belt through the stretching assembly 100. The tensioner assembly 180 takes up the slack as the belt stretches to maintain the axial tension on the belt as the belt stretches.

As described above, the stretching assembly is operable to stretch the assembled link belt 15 by applying lateral forces to the belt while the belt is under axial tension. For instance, the rotation of the carousels 120, 150 drives the carousel pulleys 130, 160 into engagement with the upper or lower surface of the belt. The carousels 120, 150 may rotate at a speed to match the speed of the belt 15 so that each carousel pulley engages and maintains contact with the belt. In such a configuration, the belt does not substantially move relative to the carousel pulleys as the belt and carousels move. However, in the present instance, the carousels 120, 150 rotate at a speed that differs from the speed of the belt. In particular, the carousels 120, 150 rotate so that the angular velocity of each carousel pulley 122, 162 is greater than the angular velocity of the belt as the belt travels around the carousels 120, 150 (wherein the angular velocity of each carousel pulley is measured with respect to the corresponding carousel axis). In this way, as the belt is pulled around the carousel 120, 150, the carousel pulleys 130, 160 are displaced toward and then away from the belt. By moving against and away from the belt, the carousel pulleys 130, 160 apply reciprocal lateral forces against the belt. The lateral reciprocal force is transverse the axis that extends through the length of the belt. In the present instance, the lateral forces are forces applied to the top 11 or bottom of the belt. Alternatively, the lateral forces may be applied to the sides 25 of the belt links 20. The lateral forces applied to the belt, combined with the axial tension in the belt improve the stretching of the belt. More specifically, the reciprocal lateral forces applied to the belt, combined with the axial tension in the belt, improves the stretching of the belt.

As shown in FIG. 6, the process for producing the link belt 15 is a continuous process so that the assembled links travel from the link assembler 70 to the oven 80 and then through the stretcher assembly 100. In other words, the output of the link assembler 70 is connected with the input of the oven 80 and the output of the oven 80 is connected with the input of the stretcher assembly 100. Alternatively, the three sections of the process may be operated separately so that the belt is discharged from the link assembler 70 and then subsequently fed into the oven 80. In such a process, the output of the link assembler 70 is not connected with the input of the oven 80. Similarly, the output from the oven 80 need not be connected with the input of the stretching assembly 100.

The terms and expressions which have been employed are used as terms of description and not of limitation. There is no intention in the use of such terms and expressions of excluding any equivalents of the features shown and described or portions thereof. It is recognized, however, that various modifications are possible within the scope of the invention as claimed. For instance, in the foregoing description, the belt links are described as having integral fasteners. However, the belt may be formed of a series of belt links that do not incorporate integral fasteners. One example of such an alternate link belt is a link belt in which the links are connected by a series of rivets. Additionally, as described above, the stretching assembly comprises a pair of carousels 120, 150. However, the stretching assembly need not have two carousels. A single carousel can be employed or alternatively three or more carousels can be utilized. Additionally, the drive element 250 that drives the belt 15 is described as a star wheel having a plurality of protrusions that positively engage the apertures in the belt to drive the belt. Alternatively, the drive element may utilize a friction element, such as a high-friction wheel that frictionally engages a surface of the belt to drive the belt forwardly. Further still, in the above description, the system incorporates both an oven to perform a first stretching step and the stretching assembly 100 to perform a second stretching step. It should be understood that the system may incorporate only one of the stretching steps if desired. For instance, the oven 80 may be omitted and the belt 15 may be conveyed directly from the link assembler 70 to the stretching assembly 100. Additionally, in the foregoing description, the stretcher assembly 100 includes one or more carousels 120, 150 operable to impart a lateral force onto the link belt. In particular, the carousel may impart a reciprocal lateral force on the link belt while the link belt is under tension. However, a variety of alternate elements may be utilized to apply a lateral force against the link belt. Such alternate elements for imparting reciprocal lateral forces may be in addition to the carousel or may be in lieu of the carousel. For instance, the stretching assembly may incorporate a reciprocating element that applies a lateral force to an edge of the belt or against a top or bottom face of the link belt while the belt is being conveyed under axial tension. The amplitude of the reciprocal motion toward and away from the belt to apply the lateral force may vary. A drive element may impart a low amplitude high frequency displacement, similar to a vibration driving an engagement element toward and away from the belt. It should therefore be understood that this invention is not limited to the particular embodiments described herein, but is intended to include all changes and modifications that are within the scope and spirit of the invention as set forth in the claims.

That which is claimed is:

1. A method for producing a link belt, comprising the steps of:
    providing a plurality of layers of reinforcing material;
    depositing a binding material on the plurality of layers of reinforcing material and overlapping the plurality of layers of reinforcing material to produce a composite material having an upper surface and a lower surface such that the plurality of layers of reinforcing material are embedded within the composite material;
    combining the composite material with a gripping layer to provide a combined gripping layer and composite material;
    curing the combined gripping layer and composite material so that the gripping layer bonds to the composite material, the step of curing providing a cured material;
    cutting the cured material to produce a plurality of belt links, wherein each of the plurality of belt links has an integral fastener, a gripping layer which corresponds to the gripping layer of the combined gripping layer and composite material, and an upper surface, wherein the gripping layer of each of the plurality of belt links is coextensive with the upper surface of each respective belt link;
    assembling the plurality of belt links to form a belt comprising adjacent belt links by connecting adjacent belt links in superimposed successive overlapping relation with the respective integral fasteners of the belt links connecting respective adjacent belt links, the belt having a first end and a second end;
    applying an axial force to the belt to stretch the belt; and
    applying a lateral force to the belt transverse to the axial force to stretch the belt during the step of applying the axial force to the belt, wherein the steps of applying the axial force and applying the lateral force to stretch the belt occur while the first end and the second end of the belt are not connected to form a continuous loop.

2. The method of claim 1 wherein the lateral force is a reciprocal lateral force and the step of applying the lateral force comprises applying the reciprocal lateral force against a face of the belt.

3. The method of claim 2 wherein the step of applying the reciprocal lateral force comprises displacing an element toward and away from the belt, the element applying the reciprocal lateral force against the face of the belt.

4. The method of claim 3 wherein the element is one of a plurality of engagement elements and the step of applying the reciprocal lateral force comprises rotating a carousel having the plurality of engagement elements, the carousel configured to engage the belt with the plurality of engaging elements.

5. The method of claim 4 wherein the step of rotating the carousel comprises rotating the carousel at an angular velocity such that each of the plurality of engagement elements moves relative to the belt.

6. The method of claim 5 wherein the belt is pulled around the carousel under tension while the carousel is rotated so that the belt travels at an angular velocity that is lower than the angular velocity at which the carousel is rotated.

7. The method of claim 4 wherein each of the plurality of engagement elements comprises a rotatable pulley or roller.

8. The method of claim 1, further comprising a step of conveying the belt through an oven to heat the belt to a temperature exceeding ambient temperature while the belt is under axial tension.

9. The method of claim 1, further comprising a step of driving the belt around a displaceable tensioning element configured to take up slack in the belt as the belt stretches during the steps of applying the axial force and applying the lateral force.

10. A method for producing a link belt, comprising the steps of:
    providing a plurality of belt links;
    assembling the plurality of belt links to form a belt comprising a series of superimposed successive overlapping belt links connected by a plurality of connectors, the belt further comprising a first end and a second end;
    applying an axial force to the belt to stretch the belt;
    applying a reciprocating lateral force to the belt, the reciprocating lateral force being transverse to the axial force, to stretch the belt during the step of applying the axial force to the belt;
    wherein the steps of applying the axial force and applying the reciprocating lateral force to stretch the belt occur while the first end and the second end of the belt are not connected to form a continuous loop.

11. The method of claim 10 wherein the step of applying the reciprocating lateral force comprises applying the reciprocating lateral force against a face of the belt.

12. The method of claim 11 wherein the step of applying the reciprocating lateral force comprises a step of displacing an element toward and away from the belt, the element applying the reciprocating lateral force against the face of the belt.

13. The method of claim 10 wherein the step of applying the reciprocating lateral force comprises applying a plurality of reciprocating lateral forces to the belt by rotating a carousel having a plurality of engagement elements configured to engage the belt, wherein each of the plurality of engagement elements applies a respective reciprocating lateral force to the belt.

14. The method of claim 13 wherein the step of rotating the carousel comprises rotating the carousel at an angular velocity such that each of the plurality of engagement elements moves relative to the belt.

15. The method of claim 14 wherein the belt is pulled around the carousel under tension while the carousel is rotated so that the belt travels at an angular velocity that is lower than the angular velocity at which the carousel is rotated.

16. The method of claim 13 wherein each of the plurality of engagement elements comprises a rotatable pulley or roller.

17. The method of claim 10, further comprising a step of conveying the belt through an oven to heat the belt to a temperature exceeding ambient temperature while the belt is under axial tension.

18. The method of claim 10, further comprising a step of driving the belt around a displaceable tensioning element configured to take up slack in the belt as the belt stretches during the steps of applying the axial force and applying the reciprocating lateral force.

19. The method of claim 10 wherein each of the plurality of belt links comprises an integral connector and an aperture and the step of assembling comprises passing the integral connector of a respective belt link through the aperture in a respective adjacent belt link to connect adjacent belt links in superimposed successive overlapping relation with the integral fasteners of respective belt links connecting respective adjacent belt links.

* * * * *